July 23, 1940.
G. GERBER
2,208,671
BUILDING STRUCTURE
Filed March 5, 1938
3 Sheets-Sheet 1
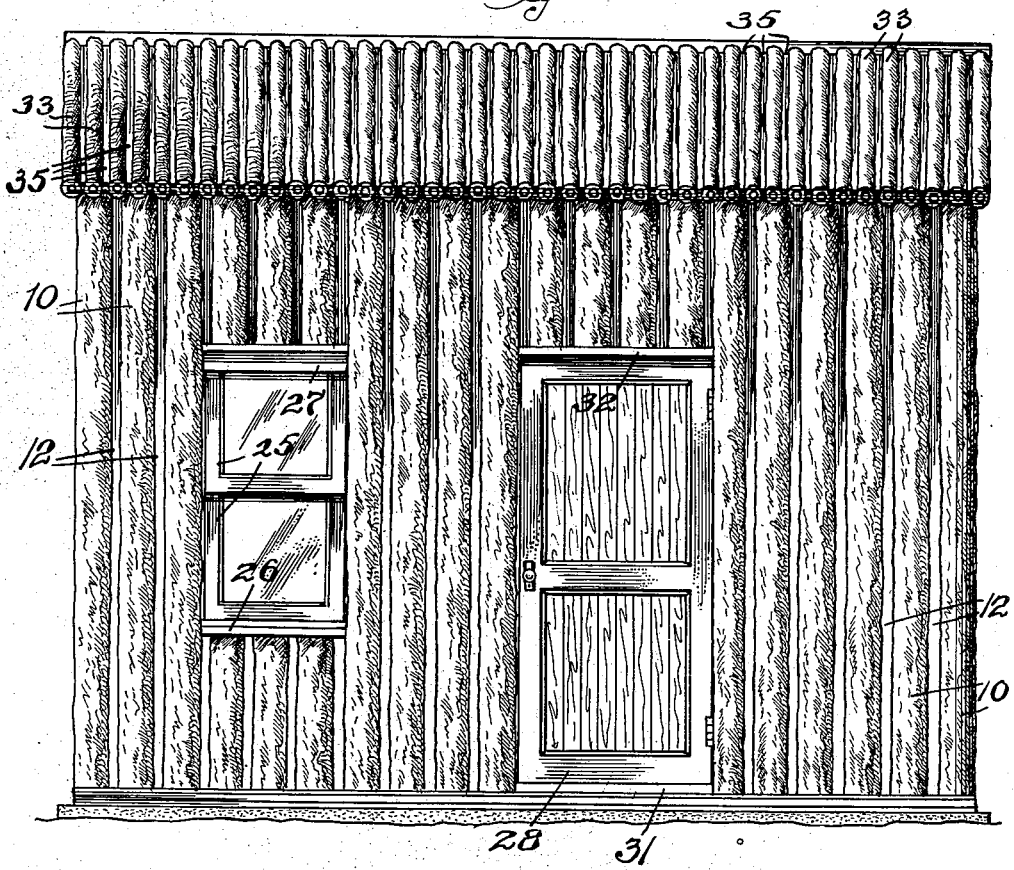
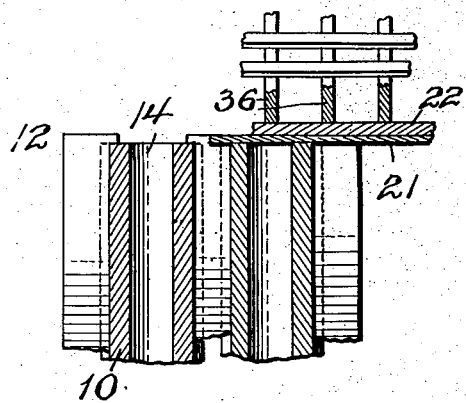
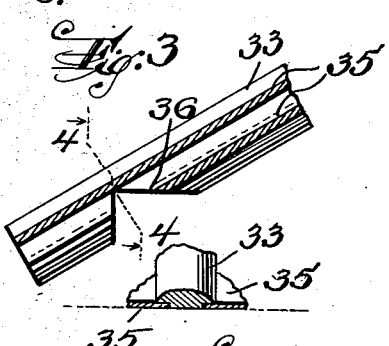
INVENTOR
Gottlieb Gerber,
BY
Wm. H. Caufield,
ATTORNEY.

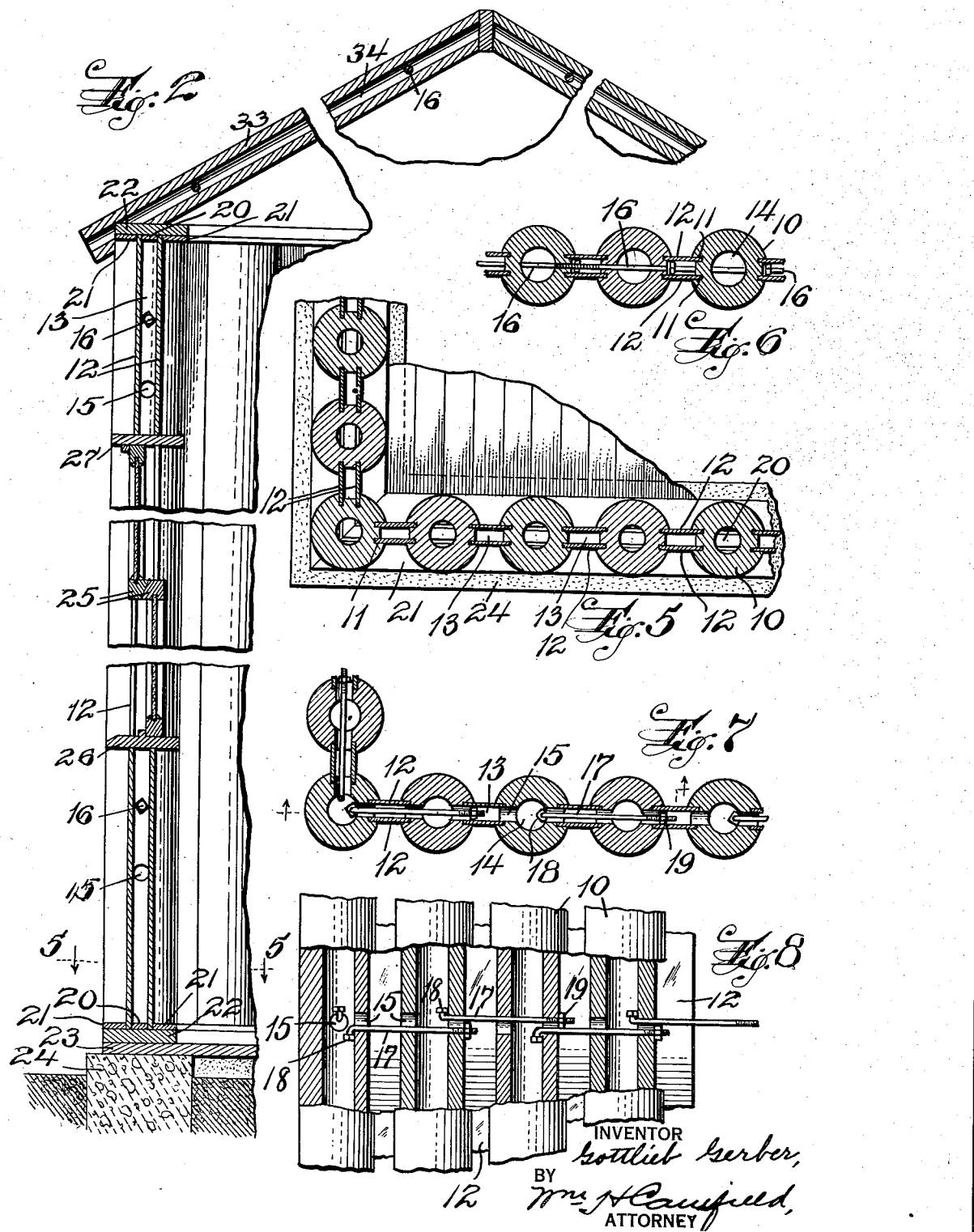

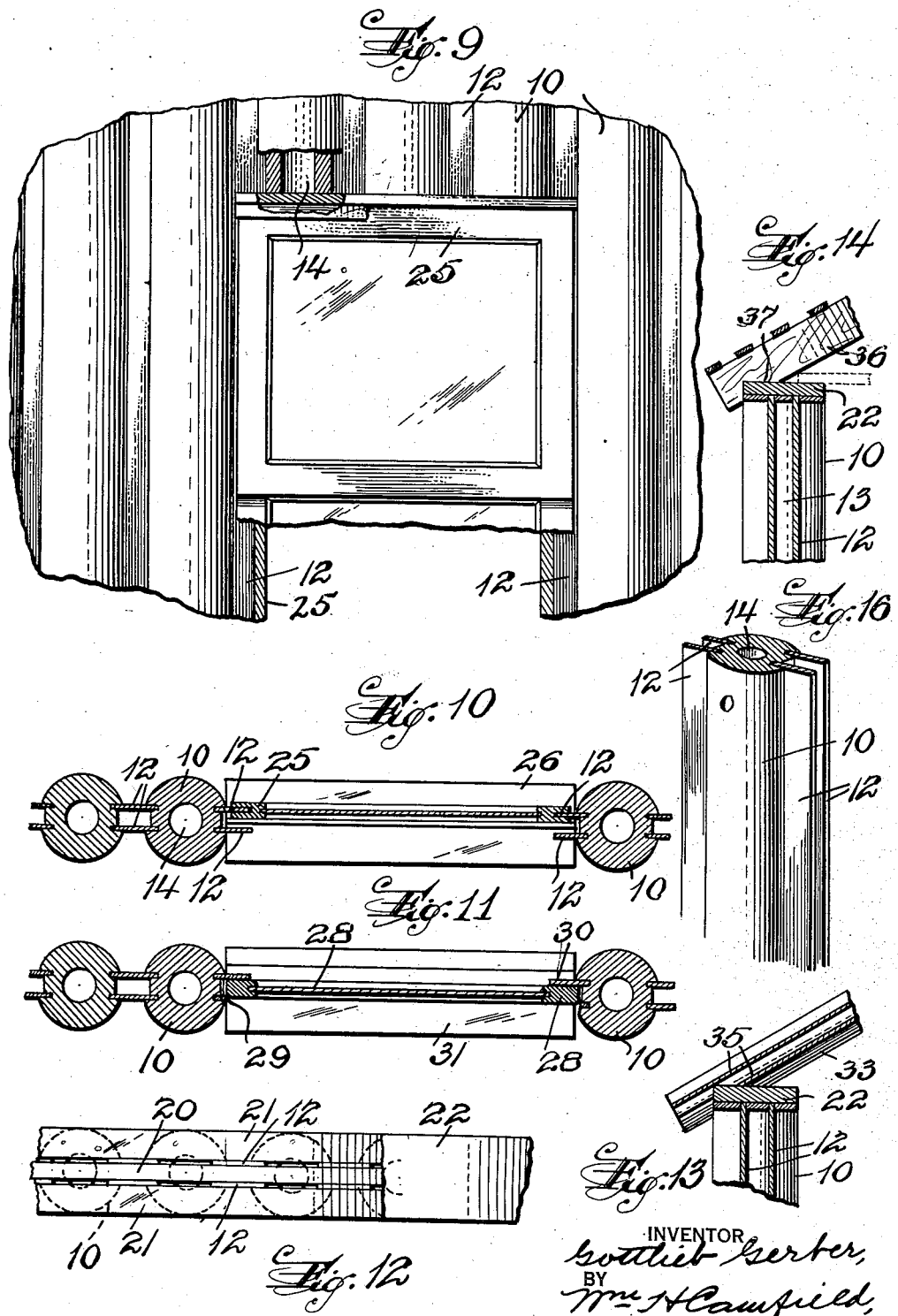

Patented July 23, 1940

2,208,671

UNITED STATES PATENT OFFICE 2,208,671

BUILDING STRUCTURE

Gottlieb Gerber, Newark, N. J.

Application March 5, 1938, Serial No. 194,096

3 Claims. (Cl. 20—4)

This invention relates to an improved building structure of the log cabin type with tight and secure walls and roof and that is designed to be erected at low cost.

The structure is intended for the utilization of small size timber which is at present considered waste or at least not suitable for log cabin use and the logs of small size can be either used in the natural condition with the bark on or they can be stripped and shaped if desired.

Another advantage of the structure is that it allows the use of green or partly dried logs which can dry out after the structure is built and in this drying causes a tightening of all joints and connections.

The structure is also novel in that it provides a ventilating and insulating wall which is of great advantage in structures of the log cabin type.

The structure is also designed to provide communicating passages in the logs and between the logs which passages can be used for the installation and concealing of pipes, wires and other accessories.

Another advantage of the invention is that the assembly forming the wall can also be used in making the roof and it is understood that in this specification the term wall includes not only the outside walls and inside partitions but also the roof.

The construction is also novel in that fillets or connectors between the logs provide stops and supports for door and window elements without regard to whether such elements include sliding sashes or swinging or hinged parts such as doors or French windows.

The invention is illustrated in the accompanying drawings. In said drawings, Figure 1 is a front view of a log cabin embodying the improved construction. Figure 2 is an enlarged sectional view of a side and roof of a log cabin made according to my invention. Figure 3 is a detail section of the end of the roof of the construction shown in Figure 2. Figure 4 is a section on line 4—4 in Figure 3. Figure 5 is a section on line 5—5 in Figure 2. Figure 6 is a view similar to that shown in Figure 5 but including a means for drawing the parts together. Figure 7 is a section similar to that shown in Figure 5 with a modified form of securing means. Figure 8 is a section on line 8—8 in Figure 7. Figure 9 is a detail view of part of a window installation in my new form of cabin. Figure 10 is a horizontal section of Figure 9. Figure 11 is a section showing the attachment of a door or swinging sash to the cabin. Figure 12 is a broken top view of a side wall of the cabin. Figure 13 is a section of the juncture of the wall and the roof. Figure 14 is a view of the juncture of the top of the wall and a roof of rafters. Figure 15 is a sectional front view of the part shown in Figure 14. Figure 16 is a detail sectional perspective of a log and adjoining fillets.

The structure selected for illustration of the preferred form is one in which the logs are used in vertical position in the side walls and in inclined position in the roof. The construction utilizes small timber either green or partly dried and of a size not considered adaptable in the old forms of cabins, that is, small timbers or logs which are considered as waste. The logs may be used with the bark or can be stripped and shaped but the former is preferred.

The logs are shown at 10 in the side wall of the cabin and they are arranged side by side and slightly spaced apart. The logs are provided with grooves 11 on the side edges or faces. The grooves are spaced apart and extend from end to end of the logs. Fillets 12 fit into the grooves and span the space between the logs and form an air space 13 between them which provides an insulating space and assists in maintaining a dry structure.

The logs are wider than the fillets and thus form a major portion of the wall. In the usual construction the logs and fillets are arranged vertically except in the roof sections.

The logs each have a central bore or passage 14 extending preferably from end to end and also acting as an insulating means. The hollow log has other advantages one of which is that the drying of the log is uniform and this prevents cracking and checking with the result that the logs are evenly dried and without defect. Another advantage of this even drying is that the shrinking of the logs closes the grooves 11 to a slight extent and the grooves more tightly grasp the fillets and make a tighter and more solid construction. The passages 14 in the hollow logs can be provided with lateral openings with proper closures and thus utilized in any ventilating means the builder chooses to install.

The logs are provided with aligned horizontal or lateral openings 15 which are aligned with the spaces 13 between the fillets 12. These lateral openings permit the installation of pipes or wires or other conveniences and with the spaces 13 and 14 provide channels for conducting such pipes or wires to any selected places in the cabin and with the advantage that they are concealed.

The logs and fillets are held in close contact by suitable means such as the lag screws 16 shown in Figures 2 and 6, these screws being inserted between fillets 12 and passed through one log into the next log and then tightened. The compression as exercised locally between adjacent logs is of advantage in that the logs can be secured successively as the building is erected and is more effective than if the whole set of logs were all held in position by a long bolt or other fastening means common to all of them. The alternative form shown in Figures 6 and 7 utilizes the lateral openings 15 for the reception of bolts 17 which have one end provided with a side projection as by bending the head 18 over and then placing the nuts 19 on the ends of the bolts on the farther edge of the next adjacent log. These bolts and the screws 16 can be placed at various levels in the wall as requirements are met.

It is desirable to provide straight edges at the top and bottom of the wall. The preferred construction is to extend the ends of the fillets a short distance beyond the ends of the logs and between these projecting ends place a central strip 20 of wood and side strips 21 on each side of the fillets as clearly seen from Figures 12 and 13. The header 22 is then placed over the whole from side to side and nailed down through the strips 21 into the logs. This provides a weather tight construction as it closes the vertical passages 13 and 14 and it also provides a solid even surface for the securing of the roof and also for seating the wall on stringers 23 and the foundation 24 as shown in Figure 2.

Where windows and doors are located the fillet and logs provide ready means for installation. In the case of sliding sashes in windows, the sashes, shown at 25, are arranged to slide on the fillets of the logs that flank the opening. This is clearly shown in Figure 10. The window is completed with the usual sill 26 and the head piece 27. This construction is economical and easily installed.

In the case of doors and French windows the fillets are used on one face to support and act as a stop for the window. The construction shown in Figure 11 illustrates the door or window 28 hinged at 29 to a log at the side of the opening, the fillet adjoining acting as a stop. The opposite side of the opening has the fillet 30 to act as a stop for the door or window. The other fillets at this point are cut back flush with the log. The usual sill 31 and header 32 are installed as usual.

The roof construction of logs is shown as comprising the logs 33 which are made hollow by boring with the channels 34 in them and connected by the fillets 35 in spaced pairs between the logs. The parts are cut away as at 36 in Figure 3 and then fitted on the header 22 on top of the wall. This provides a contact between the upper fillet 35 and the header and a tight, weather-proof joint is the result. This is due also to the other fillet or lower fillet of each pair resting on the header to form a second closure. This is plainly shown in Figure 13 where the upper fillet rests on the edge of the header 22 and the lower fillet rests on the upper surface of the header.

When it is desired to furnish a shingle or similar roof requiring rafters the rafters 36 are cut out as at 37 to rest on the headers 22 and the other parts of the roof are completed as in the old form of roof with suitable fills between the rafters outside of the headers.

The fillets are each preferably of one piece for the height or length of the logs and thus form an unbroken surface to resist leakage of wind or rain into the space between them, this being particularly desirable in the case of the fillets on the outside. The fillets are preferably narrower than the logs so as not to detract from the log-cabin appearance and to permit the use of light and relatively thin fillets as the logs form the major portion of the structure and take up the major portion of the strains.

Various changes can be made in the proportions and forms of the parts without departing from the scope of the invention.

I claim:

1. In a building structure, a wall formed of hollow logs side by side and spaced apart, fillets spanning the space between the logs, the fillets being separated to form a space between them whereby the logs and fillets form longitudinally extending air spaces within and between the logs, said logs having aligned lateral openings in line with the spaces between the fillets.

2. In a building structure, a wall formed of parallel vertically arranged logs, fillets in pairs placed between said logs and spaced apart to form air spaces, said fillets extending at one end slightly beyond the ends of the logs, a central strip extending along that end of the wall and between the fillets outside strips extending along the outside of the fillets, and a header covering said strips and the ends of the fillets and nailed to the logs through said outside strips.

3. In a building structure, a wall comprising logs having interior bores and arranged side by side with intervals between them, fillets in parallel relation to each and to the logs and arranged to span adjacent logs, the logs having aligned lateral openings in line with the spaces between the fillets whereby both vertical and horizontal passages in communication are provided for the installing of wires, pipes and similar accessories.

GOTTLIEB GERBER.